Figure 1:
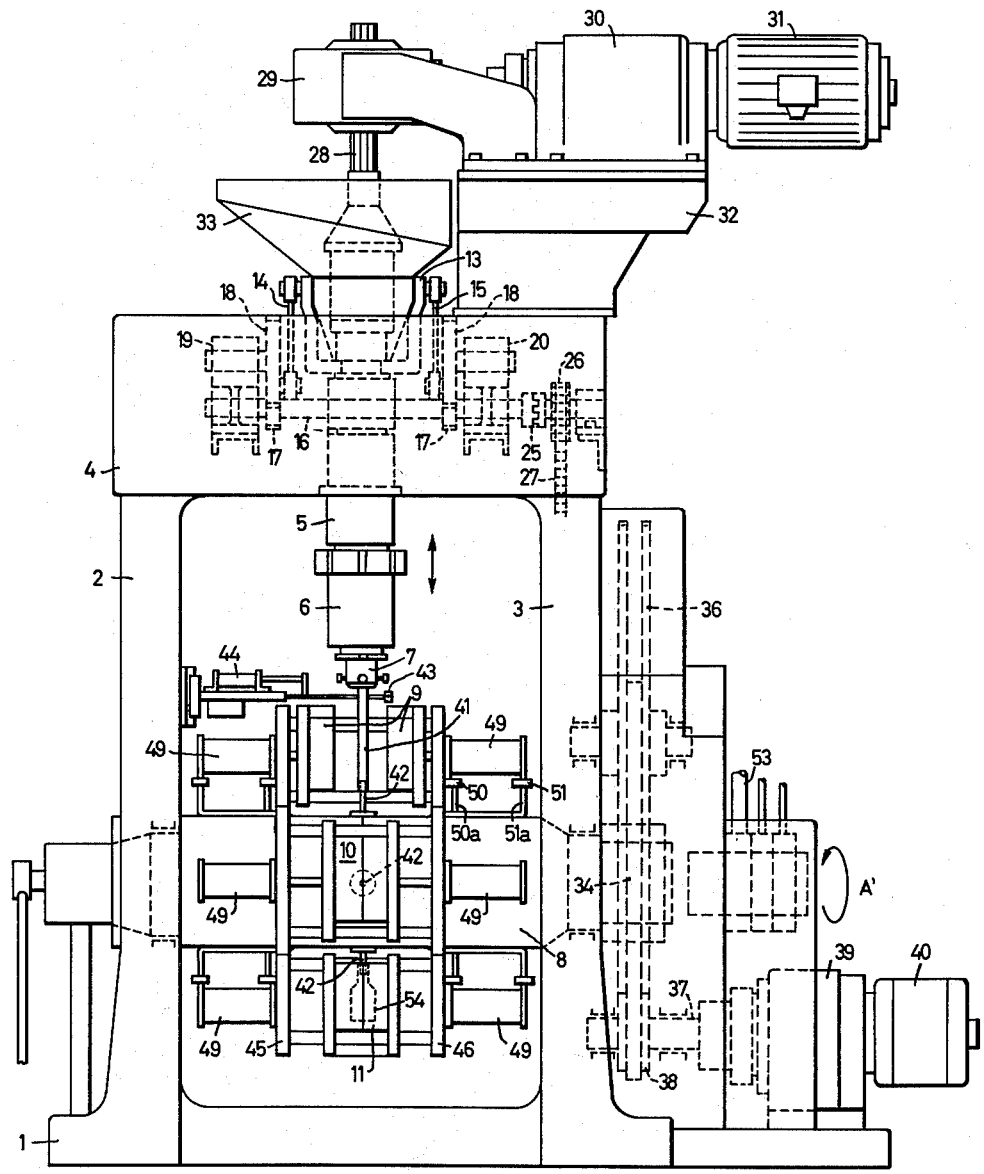

Oct. 24, 1961     H. PECHTHOLD     3,005,231
MACHINE FOR PRODUCING HOLLOW BODIES OF THERMOPLASTIC
SYNTHETICS BY EXTRUDING AND BLOWING
Filed Aug. 31, 1960     4 Sheets-Sheet 1

Oct. 24, 1961     H. PECHTHOLD     3,005,231
MACHINE FOR PRODUCING HOLLOW BODIES OF THERMOPLASTIC
SYNTHETICS BY EXTRUDING AND BLOWING
Filed Aug. 31, 1960     4 Sheets-Sheet 4

United States Patent Office

3,005,231
Patented Oct. 24, 1961

3,005,231
MACHINE FOR PRODUCING HOLLOW BODIES OF THERMOPLASTIC SYNTHETICS BY EXTRUDING AND BLOWING
Heinz Pechthold, Scheidentalerstrasse 260a, Mudau, Odenwald, Germany
Filed Aug. 31, 1960, Ser. No. 53,198
Claims priority, application Germany Sept. 9, 1959
10 Claims. (Cl. 18—5)

My invention relates to machines for the production of hollow bodies such as bottles, ampules, collapsible tubes or the like, from thermoplastic synthetic materials by a combined extruding and blowing method.

It is known to issue a hose-shaped quantity of thermoplastic material from an extrusion press into the cavity of a split mold, and, after closing the mold, to blow air into the tube of material to expand it to the walls of the cavity. It has also been proposed to use a feed screw press with a straight-forward extrusion head which moves automatically up and down in order to place the extruded hose of material into the open split molds, the molds being arranged beneath the extrusion press upon a turntable and movable radially in the table plane.

It is an object of my invention to provide a novel machine for direct blow molding with increased output and efficiency having a lower weight of the masses to be accelerated, a smaller overall size of the machinery, and affording the provision of shorter cycle periods.

According to my invention, I provide a vertically reciprocable extrusion press having a straight-forward extrusion head, with a blowing device mounted on a drum which rotates about a horizontal axis and which contains all means necessary for automatically actuating the split blow molds. Either a feed screw extrusion press or piston-type extrusion press may be used for the extrusion operation. The extrusion press and blowing device are mounted on a portal-shaped machine frame to form a single unit and are driven in a given time relation to each other for fully automatic operation. It is particularly advantageous to suspend the extrusion press symmetrically within the upper cross beam of the portal-shaped machine frame by means of a carrier bracket driven on both sides by the connecting rods of a crank drive. Preferably, the extrusion press possesses two guiding bridges extending transverse to the carrier bracket and gliding along to respective vertical guides. Hydraulic or pneumatic lifting devices are likewise applicable.

The blowing device, designed as a drum, is provided with a number of split molds which are divided in a vertical plane. For supporting these molds, the drum structure of the blowing device is provided with two star or cross-shaped carrier plates which are interconnected by guiding rods and on whose respective outer sides the control and actuating means, preferably comprising pneumatic devices, are mounted. The vertically reciprocating extrusion press, preferably a feed screw press with a straight-forward extrusion head, performs its movements in coordination with the working cycle of the drum-shaped blowing device.

By virtue of the portal shape of the machine frame structure, both sides of the drum-shaped blowing device are accessible, so that the individual blow molds are likewise readily accessible. The vertically subdivided molds are moved only in a direction parallel to the drum axis for the purpose of opening and closing the molds. The blowing device is preferably driven through a Geneva-gear mechanism which performs individual switching steps corresponding to the number of molds being used. This affords operating with a correspondingly long standstill period for each mold and facilitates discharging the finished product from the mold in a simple manner.

Figure 2:
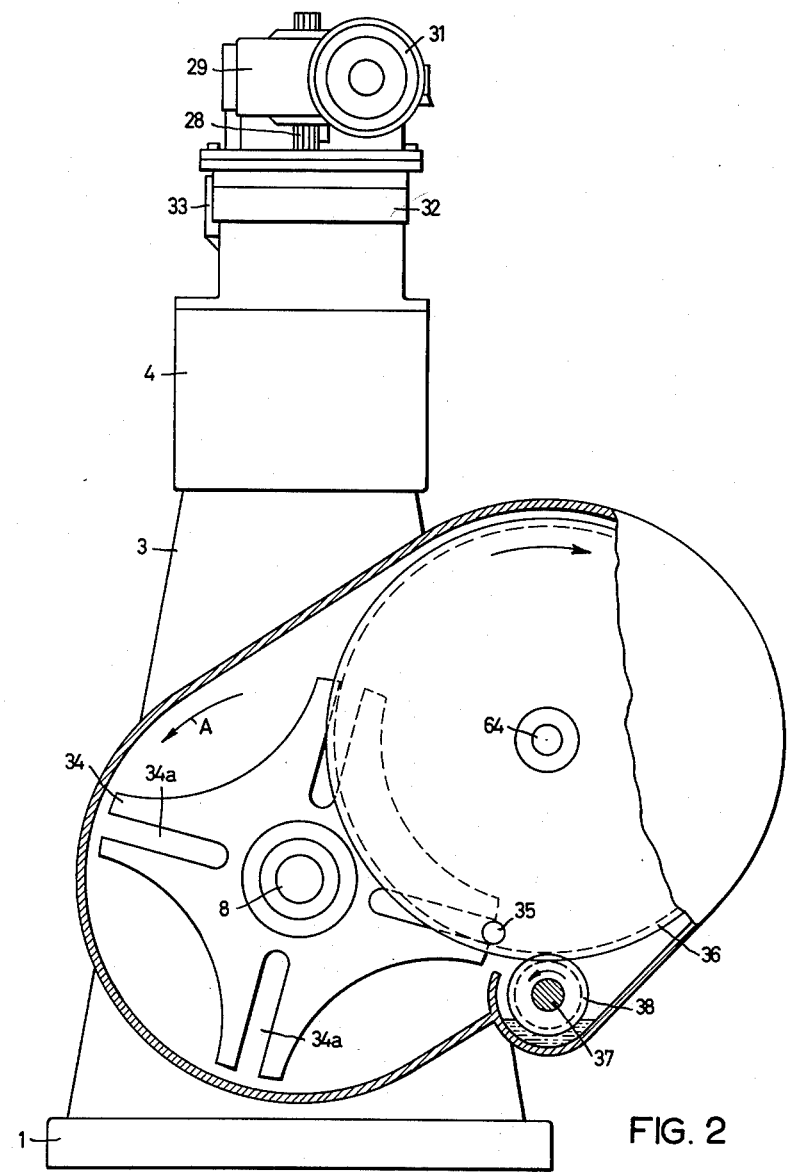
Figure 3:
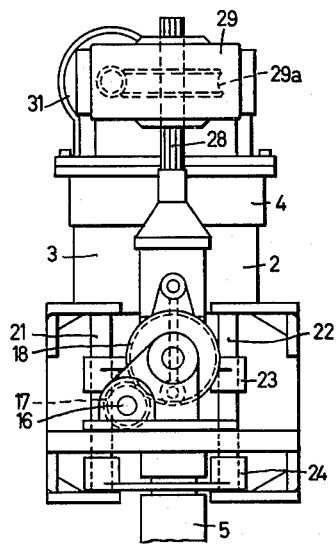
Figure 5:
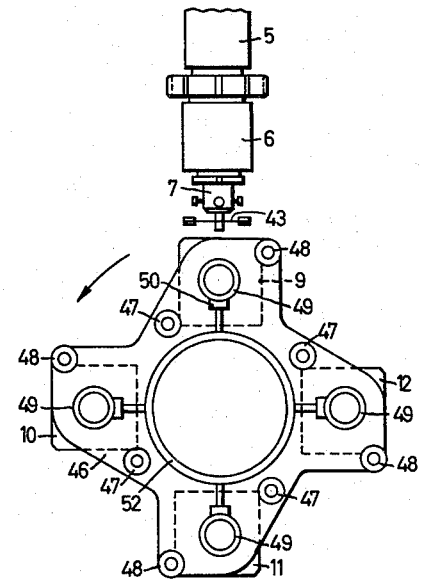
Figure 4:
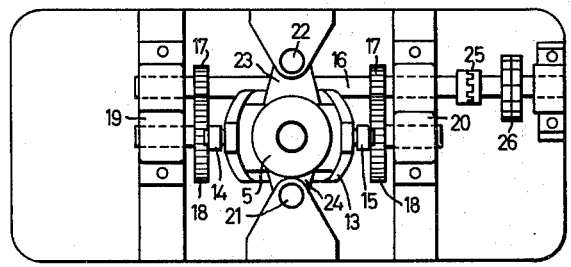
Figure 6:
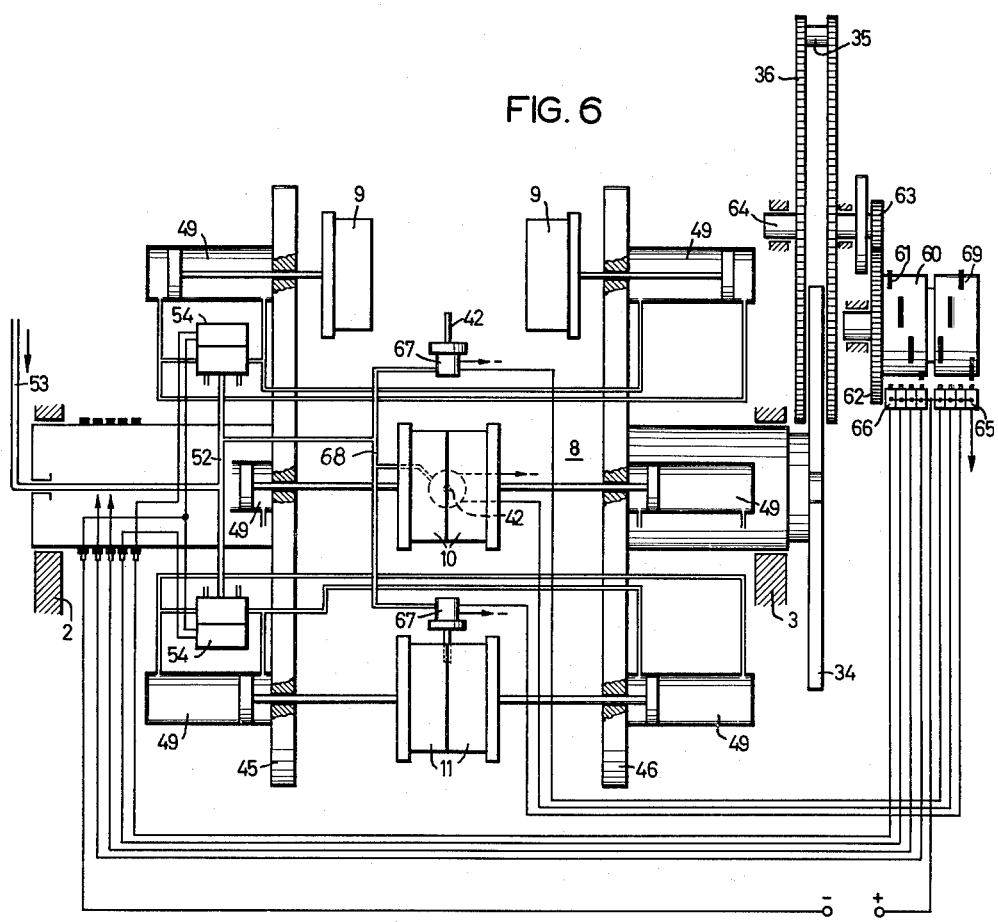
Figure 7:
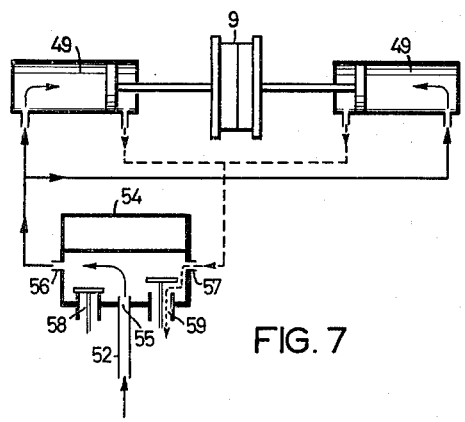
Figure 8:
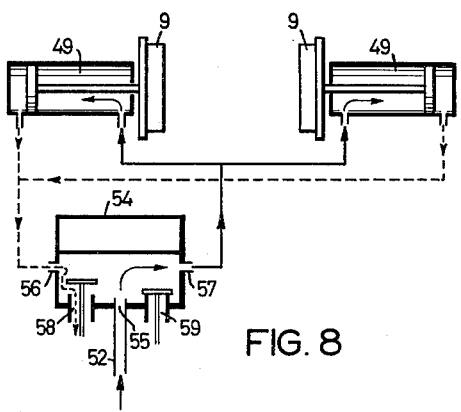

The foregoing and more specific features of my invention will be described hereinafter with reference to the embodiment of a machine according to the invention illustrated by way of example on the accompanying drawings in which:

FIG. 1 is a front view of the entire machine.
FIG. 2 is a side view.
FIGS. 3 and 4 show respectively a side view and a top view of the machine portion comprising the drive of the extrusion press.
FIG. 5 is a side view onto another portion of the machine comprising a carrier plate of the rotating drum structure in relation to the extrusion press.
FIG. 6 is a schematic diagram of the rotating drum structure, the appertaining pneumatic control devices and showing a circuit diagram of appertaining electric components.
FIG. 7 illustrates schematically one of the blow molds and pneumatic control devices in their condition for closing the mold; and
FIG. 8 illustrates schematically the same components as in FIG. 7 but in condition for opening the mold.

The illustrated machine comprises a portal-shaped frame structure composed of a base portion 1, two standards 2, 3 and a traverse beam 4 (FIGS. 1, 2, 3). Symmetrically suspended from the traverse beam 4 is a feed screw extrusion press provided with a cylinder 5 and a straight-forward extrusion head 6 having a nozzle or mouthpiece 7. The axis of the extrusion press extends vertically and coincides with the symmetry axis of the portal frame structure. Disposed beneath the extrusion press, between the two standards 2 and 3 is a blow-molding device rotatable about a horizontal axis in the direction indicated by the arrows A and A' in FIGS. 1 and 2. This blow-molding device comprises a drum structure 8 which carries four split molds 9, 10, 11 and 12 (FIGS. 1, 5) as well as all components for controlling, mounting and actuating these molds.

The vertically displaceable extrusion press 5, 6, 7 is driven by a crank mechanism 14, 15, 16 to reciprocate vertically in order to place the extruded hose-shaped quantity 41 of thermoplastic material into the respective molds 9 to 12 when the latter are in open condition. A heater (not shown) may be provided, if necessary, around cylinder 5 or in hopper 33 to heat the thermoplastic material to working temperature. For driving purposes, the cylinder 5 of the feed screw is straddled by a carrier bracket 13 (FIGS. 1, 4) which on its two sides is pivotally linked to connecting rods 14 and 15 actuated from a drive shaft 16 by respective pinions 17 meshing with respective gears 18. The crank drive shaft 16 is journaled in two bearings 19 and 20. To provide for straight-motion guidance, two guide rods 21 and 22 (FIGS. 3, 4) with respective guiding bridges 23 and 24 are provided. The drive shaft 16 is connected by a clutch 25 (FIGS. 1, 4), a sprocket 26 and an endless chain 27 with the main drive motor 40 of the machine.

The vertical feed screw (not illustrated) inside the extrusion cylinder 5 is coaxially aligned and rigidly joined with a vertical drive shaft 28 which has a toothed profile formed by uniformly distributed splines or keyways (FIGS. 1, 2, 3). The shaft 28 is engaged by a worm gear 29a (FIG. 3) located in a housing 29 (FIGS. 1, 2, 3) relative to which the shaft 28 is non-rotatable but axially displaceable. The gear 29a in housing 29 is driven through a continuously controllable speed-change gearing 30 from an electric motor 31. The driving assembly of motor 31 and gear housing 30 is mounted on a base 32 firmly secured to the top of the traverse beam 4. The synthetic themoplastic material to be fabricated is filled into a hopper 33 which is tightly connected with the feed-screw cylinder 5 of the extrusion press.

The drum structure 8 of the blow-molding device is driven by a Geneva gear 34 coaxially fastened to the drum structure 8 (FIGS. 1, 2). The Geneva gear 34 has as many radial gear slots 34a as the drum structure possesses molds and hence, in the illustrated embodiment, is provided with four such slots displaced 90° from each other. The slots are sequentially engaged by a driver pin 35 of a drive gear 36 which meshes with a pinion 38 on a shaft 37 (FIGS. 1, 2). Shaft 37 is driven through a continuously controllable speed-change gearing 39 from a main drive motor 40. Gear 39 and motor 40 are mounted on the base 1 of the machine frame structure.

In the illustrated condition of the machine as shown in FIG. 1, the extrusion press with its extrusion head 6 and nozzle 7 are located just at the lower dead center point of their vertical reciprocation, which is synchronized with the cycle of rotation of drum structure 8 with molds 9 to 12. It will be understood, of course, that more than four molds can be used if desired, with a correspondingly larger number of slots 34a. The one mold 9 located directly beneath the nozzle 7 of the extrusion press is open so that the hose 41 of synthetic thermoplastic material issuing from the nozzle 7 is placed with its lower, open end onto a blow-nozzle tube 42 which protrudes upwardly into the space between the two, now open half-portions of the split mold (first stage of the cycle). The blow tube 42 is mounted on the drum structure 8, one of the blow tubes 42 being provided for each of the respective molds 9 to 12.

The machine according to the invention may also be provided with an extrusion press which simultaneously extrudes a plurality of hose portions 41 of thermoplastic material. In this case the molds 9–12 are designed as multiple-cavity molds. In all other respects the design and operation of the machine remains as described herein.

After the hose 41 has been extruded from nozzle 7 down into the open mold space and had its lower end closed off by engagement with the blow tube 42, the mold 9 is closed by moving its two half-portions symmetrically toward each other into tightly closing contact. The hose 41 is then cut off at its upper end. This is done automatically, for example by means of an electrically heated wire 43 of a severing device 44. Thereafter the extrusion press 5, 6, 7 moves upwardly (second stage of the cycle).

In the meantime, the driver pin 35 (FIG. 2) has again engaged a gear slot 34a of the Geneva gear 34 and advances the drum structure 8 about 90° (or one mold increment of the drum circumference) in the counterclockwise direction indicated by the arrow A in FIG. 2. At the commencement of this rotary drum motion, air under pressure is supplied through the blow nozzle tube 42 into the thermoplastic hose 41 and expands it to the shape of the desired hollow body, as determined by the shape of the inner wall of the mold 9. The extrusion press has now reached its upper dead center position and commences to again move downwardly (third stage of operating cycle). After termination of the next following drum advancing motion of about 90°, the first working stage (uppermost position) commences for the next following mold 12. Shortly before the mold 9 reaches its third travelling position, the supply of air through the nozzle tube 42 is terminated and the air still contained in the mold can now escape. When the third switching position is reached, that is after the mold 9 has advanced counterclockwise three times by 90° (to the position which had been occupied by mold 12 in FIG. 5) the mold is opened and the finished hollow body 54 (FIG. 1) is ejected from the mold in the usual manner. The mold 9 then travels forward into the original position and the first working stage again commences for this mold.

The individual molds 9 to 12 are secured to the drum structure 8 by means of two carrier plates 45, 46 which are axially spaced from each other (FIGS. 1, 5). The carrier plates 45, 46 may be given a cross or star-shaped design as apparent from FIG. 5. The plates 45, 46 are connected with each other by bolts 47, 48 (FIG. 5). A pair of these bolts 47, 48 are respectively provided as a guiding means for each of the molds.

The motion and control of the molds 9 to 12 is effected pneumatically. For this purpose, each half-portion of the molds 9–12 is provided with a pneumatic control cylinder 49 (FIGS. 1, 5), whose operation is controlled by means of valves 50, 51 which are actuated from dogs 50a and 51a located on the drum structure 8. The compressed air is supplied through a ring channel 52 (FIG. 5) on drum structure 8 and passes from the ring channel to the individual control cylinders 49 through respective lines 53.

The above-described control for closing and opening the molds 9 to 12 will be more fully understood from FIG. 6. As mentioned, each half-portion of the mold is provided with a control cylinder 49 which is pneumatically actuated in order to effect a uniform opening and closing motion of the mold. The compressed air for operating the cylinder 49 is supplied into the drum structure 8 through a manifold lead 53. Thence the air passes through a ring-line 52 and through four electromagnetic pneumatic control valves 54 to the respective control cylinders 49. Consequently, each of these cylinders 49 is assigned one electrically controlled, pneumatic valve 54 which constitutes a four-way valve. That is, as best shown in FIG. 7, each valve 54 has a common inlet channel 55 for compressed air, two outlet channels 56, 57 and two reutrn channels 58, 59. When the valve is not electrically energized it opens the one outlet channel 56. When the valve is under electric voltage actuation, it opens the other outlet channel 57. The return channel 59 is simultaneously opened with channel 57 in order to permit the compressed air to be discharged. The compressed-air lines for closing and opening extend from the control valve 54 to the cylinders 49. In FIGS. 7 and 8 two different positions of the valve 54 are illustrated in relation to the actuation of the pneumatic cylinder 49 for closing and opening the mold 9 respectively.

The electric control of the valves 54 is effected by means of a contact drum 60 (FIG. 6) which is provided with adjustable dogs or cams 61. The contact drum 60 is flanged to a spur gear 62 which meshes with a pinion 63 firmly secured to the shaft 64 of the drive gear 36 of the Geneva wheel 34. The transmission ratio between the pinion 63 and the spur gear 62 is 4:1 for the illustrated embodiment with four molds 9–12. That is, when the Geneva driving gear 36 performs four complete rotations and hence the Geneva gear 34 performs four consecutive switching steps to move four molds through their respective stages of a cycle, the contactor drum 60 completes a full rotation. The dogs 61 are mounted on contactor drum 60 displaced 90° from each other in the peripheral direction.

The dogs 61 actuate limit switches 65 in such a manner that when a dog 61 runs onto the tappet 66 of the limit switch 65 the electric circuit of this switch is interrupted. The electrically controlled valve 54 then opens the valve connection to the pneumatic cylinder 49. When the dog 61 runs off the tappet 66 of the limit switch 65, the electric circuit of this switch is closed and the pneumatic cylinder 49 closes the mold 9. The same arrangement is repeated as many times as there are molds; that is, there are four such limit switches and control devices in the case of the illustrated embodiment.

The control of the air supplied to the respective blow nozzle tubes 42 is effected in a similar manner. That is, all nozzle tubes 42 are supplied through a common ring-line 68 from the compressed-air supply line 53 and are each provided with an electromagnetically controlled valve 67 which is actuated from separate dogs 69 on the contactor drum 60. It will be understood that the control of the valves 54 may also be effected mechanically by means of cam discs.

The drum structure 8 constitutes essentially a hollow shaft, the compressed-air lines leading to the cylinders 49 and the blow tubes 42 being located inside the drum structure.

It will be apparent to those skilled in the art, upon a study of this disclosure, that my invention permits of a variety of modifications and hence can be given embodiments other than particularly illustrated and described herein, without departing from the essential features of my invention and within the scope of the claims annexed hereto.

I claim:

1. A machine for the automatic production of hollow bodies from thermoplastic materials by extruding a hose-shaped portion of said materials into a mold cavity and expanding the hose into the mold cavity by blowing, said machine comprising a frame structure, an extrusion press supported from said frame structure and having an extrusion head provided with an outlet nozzle movable to and fro in a rectilinear and vertical direction along the longitudinal axis of said head; a blow-molding device comprising a drum structure having mounting plate means journaled in said frame structure for rotation about an axis of said drum extending horizontally at right angles to said rectilinear direction, a plurality of split molds divided longitudinally in a vertical plane and respectively mounted on said plate means for rotation about said drum axis and for movement only in the direction of said drum axis for opening and closing the respective split molds, control and actuating means mounted on said drum for actuating said split molds into open and closed positions in respective rotational positions of said drum, each mold in a predetermined respective rotary position of said drum being positionable to receive said hose of material from said outlet nozzle of said press; means for feeding a quantity of thermoplastic material into said extrusion press, drive means for reciprocating said press into and out of a respective one of said molds to deposit said hose of material therein, and means for severing said hose of material from said nozzle, and air-supply means fixedly mounted within said drum and separate from said molds for expanding said hose-shaped quantity of material to conform to the shape of said respective one mold.

2. A machine for the automatic production of hollow bodies from thermoplastic materials by extruding a hose-shaped portion of said materials into a mold cavity and expanding the hose into the mold cavity by blowing, said machine comprising a frame structure, an extrusion press supported from said frame structure and having an extrusion head provided with an outlet nozzle reciprocable in a vertical rectilinear direction along the longitudinal axis of said head; a blow-molding device comprising a drum structure having mounting plate means journaled in said frame structure for rotation about a horizontal axis, a plurality of split molds divided longitudinally in a vertical plane and respectively mounted on said plate means for rotation about said drum axis and for movement only in the direction of said drum axis for opening and closing the respective split molds, control and actuating means mounted on said drum for actuating said split molds into open and closed positions in respective rotational positions of said drum, each mold in a predetermined respective rotary position of said drum being in position to receive said hose of material from said outlet nozzle of said press; means for feeding a quantity of thermoplastic material into said extrusion press, drive means for reciprocating said press into and out of a respective one of said molds in said respective predetermined position to deposit said hose of material in said mold, and means for severing said hose of material from said nozzle, and air-supply means fixedly mounted within said drum and separate from said molds for expanding said hose-shaped quantity of material to conform to the shape of said respective one mold.

3. A machine for the automatic production of hollow bodies from thermoplastic materials by extruding a hose-shaped portion of said materials into a mold cavity and expanding the hose into the mold cavity by blowing, said machine comprising a frame structure, a feed-screw extrusion press supported from said frame structure and having an extrusion head provided with an outlet nozzle reciprocable in a vertical rectilinear direction along the longitudinal axis of said head; a blow-molding device comprising a drum structure having mounting plate means journaled in said frame structure for rotation about a horizontal axis, a plurality of split molds divided longitudinally in a vertical plane and respectively mounted on said plate means for rotation about said drum axis and for movement only in the direction of said drum axis for opening and closing the respective split molds, control and actuating means mounted on said drum for actuating said split molds into open and closed positions in respective rotational positions of said drum, each mold in a predetermined respective rotary position of said drum being in position to receive said hose of material from said outlet nozzle of said press; means for feeding a quantity of thermoplastic material into said extrusion press, drive means for reciprocating said press into and out of a respective one of said molds in said respective predetermined position to deposit said hose in said mold; and means for severing said hose of material from said nozzle, and air-supply means fixedly mounted within said drum and separate from said molds for expanding said hose-shaped quantity of material to conform to the shape of said respective one mold.

4. A machine for the automatic production of hollow bodies from thermoplastic materials by extruding a hose-shaped portion of said materials into a mold cavity and expanding the hose into the mold cavity by blowing, said machine comprising a portal-shaped frame structure, an extrusion press supported from said frame structure and having an extrusion head provided with an outlet nozzle vertically reciprocable in a rectilinear direction; a blow-molding device comprising a drum structure having mounting plate means journaled in said frame structure for rotation beneath said extrusion press about a horizontal axis, a plurality of split molds divided longitudinally in a vertical plane and respectively mounted on said plate means for rotation about said drum axis and for movement only in the direction of said drum axis for opening and closing the respective split molds, control and actuating means mounted on said drum for actuating said split molds into open and closed positions in respective rotational positions of said drum, each mold in a predetermined respective rotary position of said drum being positionable to receive said hose of material from said outlet nozzle of said press; means for feeding a quantity of thermoplastic material into said extrusion press, drive means for reciprocating said press into and out of a respective one of said molds when said one mold is in open position to deposit said hose of material therein, means for severing said hose of material from the nozzle, and air-supply means fixedly mounted within said drum and separate from said molds for expanding said hose-shaped quantity of material to conform to the shape of said respective one mold; said extrusion press, said blow-molding device, said molds, said control and actuating means, said drive means and said means for closing said split mold all being joined with said portal-shaped frame structure to form a single unit together therewith.

5. Machine according to claim 4, said portal-shaped frame structure comprising a base, support columns, a transverse beam and carrier means dependent from said beam, said extrusion press being symmetrically supported within said portal frame structure from said transverse beam by said carrier means, and lifting means operatively linked to said carrier means for moving said extrusion press cyclically up and down relative to said transverse beam and in coordination with said control means.

6. Machine according to claim 5, said carrier means comprising a carrier bracket for supporting said extrusion press from said transverse beam, and said lifting means comprising fluid-operated means for moving said carrier bracket and said extrusion press cyclically up and down.

7. Machine according to claim 4, said portal-shaped frame structure comprising a base, support columns, a transverse beam, a carrier bracket dependent from said beam, and crank drive means operatively linked to said carrier bracket for cyclically reciprocating said extrusion press vertically in coordination with said control means.

8. Machine according to claim 4, said portal-shaped frame structure comprising a base, support columns, a transverse beam, a carrier bracket dependent from said beam, bridge means extending transversely to said guiding bracket and having a pair of guide rods for providing rectilinear motion guidance to define a travel path for said extrusion press in said vertical direction, and crank drive means operatively linked to said carrier bracket for cyclically reciprocating said extrusion press along said travel path.

9. Machine according to claim 4, said mounting plate means comprising a pair of coaxially spaced, mutually opposed mounting plates on which the respective co-operating mold portions are mounted, a plurality of guiding rods fixed between said plates for guiding the motion of said molds during rotation of said plate means about said drum axis, said control and actuating means for closing and opening said molds being mounted on said drum outside of said opposed mounting plates.

10. Machine according to claim 4, said air-supply means for expanding said hose-shaped quantity of material comprising a blow-tube positioned between but separate from the portions of said split mold for receiving said hose of material from said nozzle, and air pressure conduit means connected to said blow-tube and having valves under control of said control and actuating means for supplying air to said blow-tube at predetermined intervals during rotation of said drum to expand said quantity of material to conform to the shaped of said mold.

References Cited in the file of this patent
UNITED STATES PATENTS

| | | |
|---|---|---|
| 2,579,399 | Ruekberg | Dec. 18, 1951 |
| 2,674,006 | Bailey et al. | Apr. 6, 1954 |
| 2,750,625 | Colombo | June 19, 1956 |
| 2,952,034 | Fortner | Sept. 13, 1960 |